United States Patent
Backes

(10) Patent No.: US 9,513,738 B2
(45) Date of Patent: Dec. 6, 2016

(54) INPUT DEVICE AND POSITION DETERMINING METHOD

(75) Inventor: Ulrich Backes, Radolfzell (DE)

(73) Assignee: TRW Automotive Electronics & Components GmbH (DE)

(*) Notice: Subject to any disclaimer, the term of this patent is extended or adjusted under 35 U.S.C. 154(b) by 690 days.

(21) Appl. No.: 13/448,655

(22) Filed: Apr. 17, 2012

(65) Prior Publication Data

US 2012/0265485 A1 Oct. 18, 2012

(30) Foreign Application Priority Data

Apr. 21, 2011 (DE) ........................ 10 2011 018 463

(51) Int. Cl.
| | | |
|---|---|---|
| G06F 19/00 | (2011.01) | |
| G01R 27/26 | (2006.01) | |
| G06F 3/041 | (2006.01) | |
| G06F 3/044 | (2006.01) | |
| G06F 3/045 | (2006.01) | |

(52) U.S. Cl.
CPC ............ G06F 3/0416 (2013.01); G06F 3/044 (2013.01); G06F 3/045 (2013.01)

(58) Field of Classification Search
CPC ........ G06F 3/041; G06F 3/044; G06F 15/00; G06F 3/0418; G06F 3/0416; G06F 3/045; G06K 9/0002; G01R 27/26
USPC ............................................. 702/47, 52, 150
See application file for complete search history.

(56) References Cited

U.S. PATENT DOCUMENTS

| | | | | |
|---|---|---|---|---|
| 4,039,940 A | * | 8/1977 | Butler | G01R 27/2605 324/607 |
| 4,476,463 A | * | 10/1984 | Ng | G06F 3/045 345/174 |
| 7,129,714 B2 | * | 10/2006 | Baxter | G01D 5/24 324/658 |
| 7,148,704 B2 | | 12/2006 | Philipp | |
| 7,612,767 B1 | * | 11/2009 | Griffin | G06F 3/044 178/19.03 |
| 2003/0190061 A1 | * | 10/2003 | Chou | G06K 9/0002 382/124 |
| 2005/0052429 A1 | * | 3/2005 | Philipp | G06F 3/03547 345/173 |
| 2006/0055416 A1 | * | 3/2006 | Kinoshita | G01D 5/24 324/658 |

(Continued)

FOREIGN PATENT DOCUMENTS

| | | |
|---|---|---|
| CN | 101305338 | 11/2008 |
| CN | 101859215 | 10/2010 |

(Continued)

*Primary Examiner* — John Breene
*Assistant Examiner* — Mohammad Islam
(74) *Attorney, Agent, or Firm* — Tarolli, Sundheim, Covell & Tummino LLP

(57) ABSTRACT

An input device (10) has a contact plate (12) having a contact surface (14) and being least partially coated with an electrical resistive layer (16) on a surface opposite the contact surface (14). The electrical resistive layer (16) has at least two electrically conducting contacts (18). A measuring circuit (20) is provided for measuring a sensing capacitor (24) formed by the electrical resistive layer (16) and an electrostatically chargeable object (22) arranged at a contact position on the contact surface (14). Further, a processing unit is provided for determining coordinates (X, Y) of the contact position of the electrostatically chargeable object (22) on the contact surface (14) by means of a determination of the ohmic resistances ($R_n$) between the contact position of the electrostatically chargeable object (22) and the electrically conducting contacts.

4 Claims, 2 Drawing Sheets

(56) References Cited

U.S. PATENT DOCUMENTS

| | | |
|---|---|---|
| 2007/0165004 A1 | 7/2007 | Seelhammer et al. |
| 2008/0048997 A1* | 2/2008 | Gillespie ............. G06F 3/03547 345/174 |
| 2008/0158172 A1* | 7/2008 | Hotelling .............. G06F 1/3231 345/173 |
| 2009/0046077 A1 | 2/2009 | Tanaka et al. |
| 2010/0045632 A1* | 2/2010 | Yilmaz ................ G01D 5/2405 345/174 |
| 2010/0110040 A1* | 5/2010 | Kim ..................... G06F 3/0412 345/174 |
| 2010/0127717 A1* | 5/2010 | Cordeiro ............. G06F 3/0416 324/678 |
| 2010/0141275 A1* | 6/2010 | Matsushima ........... G06F 3/044 324/678 |
| 2010/0181180 A1* | 7/2010 | Peter .................... H03K 17/955 200/5 R |
| 2010/0259503 A1 | 10/2010 | Yanase et al. |
| 2011/0001491 A1* | 1/2011 | Huang ................. G06F 3/0416 324/658 |
| 2011/0100728 A1* | 5/2011 | Chen ...................... G06F 3/044 178/18.06 |
| 2011/0310025 A1* | 12/2011 | Simmons ............. G06F 3/0416 345/173 |

FOREIGN PATENT DOCUMENTS

| | | |
|---|---|---|
| DE | 80/01762 | 9/1980 |
| DE | 3230919 | 3/1983 |
| JP | 2005 301974 | 10/2005 |
| JP | 2008198063 | 8/2008 |

* cited by examiner

INPUT DEVICE AND POSITION DETERMINING METHOD

FIELD OF THE INVENTION

The invention relates to an input device as well as to a method of determining the position of an object on a contact plate of an input device.

BACKGROUND OF THE INVENTION

Input devices comprising contact plates are known from prior art in the form of touch pads or touch screens, for instance. Resistive, capacitive and inductive devices are known to be used in determining the position of an object on the contact plate, for instance, a finger. Devices of this type require a complex configuration of the sensor system.

BRIEF SUMMARY OF THE INVENTION

It is an object of the invention to provide an input device which facilitates a simple construction of the input device and of the required sensor system.

This object is achieved by an input device that has a contact plate having a contact surface and being least partially coated with an electrical resistive layer on a surface opposite the contact surface. The electrical resistive layer has at least two electrically conducting contacts. A measuring circuit is provided for measuring a sensing capacitor formed by the electrical resistive layer and an electrostatically chargeable object arranged at a contact position on the contact surface. Further, a processing unit is provided for determining coordinates of the contact position of the electrostatically chargeable object on the contact surface by means of a determination of the ohmic resistances between the contact position of the electrostatically chargeable object and the electrically conducting contacts.

This allows a simple construction of the input device as merely one single electrical resistive layer on the contact plate has to be provided. Since the resistive layer is arranged on the surface facing away from the contact surface, the resistive layer is protected against damage by the contact plate itself.

A better accuracy in determining the coordinates may be achieved by providing at least three electrically conducting contacts on the electrical resistive layer.

The measuring circuit preferably comprises a reference capacitor. The measuring technique can be simplified by providing a reference capacitor with known capacitance.

The measuring circuit may comprise several switches designed for charging a sensing capacitor formed by the electrical resistive layer and the electrostatically chargeable object, for equalization of charge between the sensing capacitor and the reference capacitor and for discharging the sensing capacitor and the reference capacitor.

The electrical resistive layer may be formed so as to fully cover a surface area or so as to be ring-shaped. This allows a varied and flexible design of the input device.

A further object of the invention is to provide a position determining method.

A method for determining the position of an electrostatically chargeable object on a contact plate of an input device comprises the process steps of measuring an RC element with the sensing capacitor and the ohmic resistance between the contact position of the electrostatically chargeable object and each one of the electrically conducting contacts when the sensing capacitor is fully electrically charged; measuring the RC element with the sensing capacitor and the ohmic resistance between the contact position of the electrostatically chargeable object and each one of the electrically conducting contacts when the sensing capacitor is partially electrically charged; determining the ohmic resistance between the contact position of the electrostatically chargeable object and each one of the electrically conducting contacts by measuring the corresponding RC element; and determining the contact position of the electrostatically chargeable object by means of the ohmic resistances between the contact position of the electrostatically chargeable object and the electrically conducting contacts.

The method can be used with an input device as described above.

A process step may be provided in which the capacitance of the sensing capacitor is determined.

Preferably, a voltage across a reference capacitor is measured during measuring the RC element. In this way, the process of measuring the RC element is made possible by a simple voltage metering.

The process of measuring the RC element preferably comprises the process steps of fully discharging the sensing capacitor and the reference capacitor; fully charging the sensing capacitor; equalizing charge between the sensing capacitor and the reference capacitor; measuring the voltage across the reference capacitor; and repeating the process steps with partially charging the sensing capacitor for a charging duration.

The ohmic resistance between the contact position of the electrostatically chargeable object and each one of the electrically conducting contacts is preferably calculated according to the formula:

$$R_n = \frac{V_{ref} t}{C_s U_{s1} \ln\left(\frac{U_{s1}}{U_{s1} - U_{s2}}\right)}$$

wherein $V_{ref}$ is the charging voltage of the sensing capacitor, t is the charging duration for partially charging the sensing capacitor, $U_{S1}$ is the voltage across the reference capacitor for fully charging the sensing capacitor; $U_{S2}$ is the voltage across the reference capacitor for partially charging the sensing capacitor; and $C_S$ is the capacity of the sensing capacitor.

The coordinates of the contact position of the electrostatically chargeable object are preferably calculated according to the formulas:

$$X = \frac{\sum_{n=1}^{N} \frac{Xkontakt_n}{R_n^2}}{\sum_{n=1}^{N} \frac{1}{R_n^2}}$$

$$Y = \frac{\sum_{n=1}^{N} \frac{Ykontakt_n}{R_n^2}}{\sum_{n=1}^{N} \frac{1}{R_n^2}}$$

wherein $Xkontakt_n$ and $Ykontakt_n$ are the coordinates of the nth electrically conducting contact and $R_n$ is the ohmic resistance between the contact position of the electrostatically chargeable object and the nth electrically conducting contact.

DETAILED DESCRIPTION OF THE PREFERRED EMBODIMENT

Figure 1:
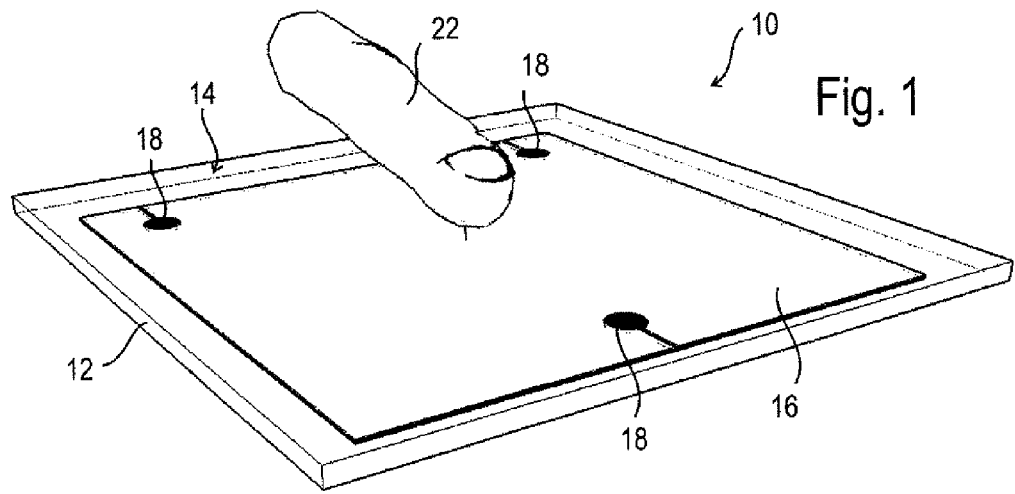
FIG. 1 shows a perspective view of an input device according to a first embodiment of the invention.

FIG. 1 shows an input device 10 comprising a transparently illustrated contact plate 12. The contact plate 12 has a contact surface 14. An electrical resistive layer 16 is provided on the surface of the contact plate 12 facing away from the contact surface 14, i.e. on the "rear side". The resistive layer 16 is connected to a measuring circuit 20 via three electrically conducting contacts 18.

The electrical resistive layer 16 is formed in rectangular shape and so as to fully cover a surface area.

An electrostatically chargeable object, in the illustrated embodiment a finger 22, rests on the contact surface 14 of the contact plate 12 at a contact position.

Figure 2:
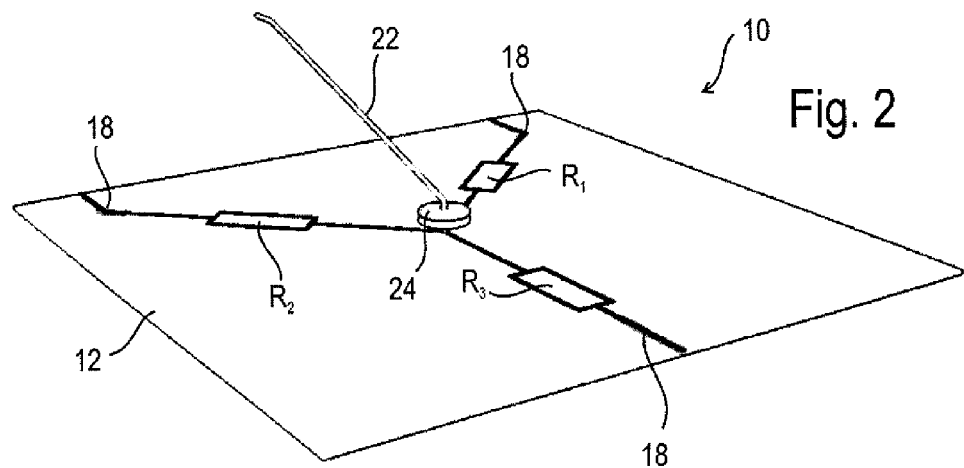
FIG. 2 shows the input device according to FIG. 1 in the form of an equivalent circuit diagram.

FIG. 2 shows the input device 10 according to FIG. 1 in the form of an equivalent circuit diagram. A sensing capacitor 24 is formed by the electrostatically chargeable object 22 arranged on the contact position of the contact surface 14. The electrical resistive layer 16 forms an ohmic resistance $R_1$, $R_2$, $R_3$ between the contact position of the electrostatically chargeable object 22 and each one of the electrically conducting contacts 18.

Figure 3:
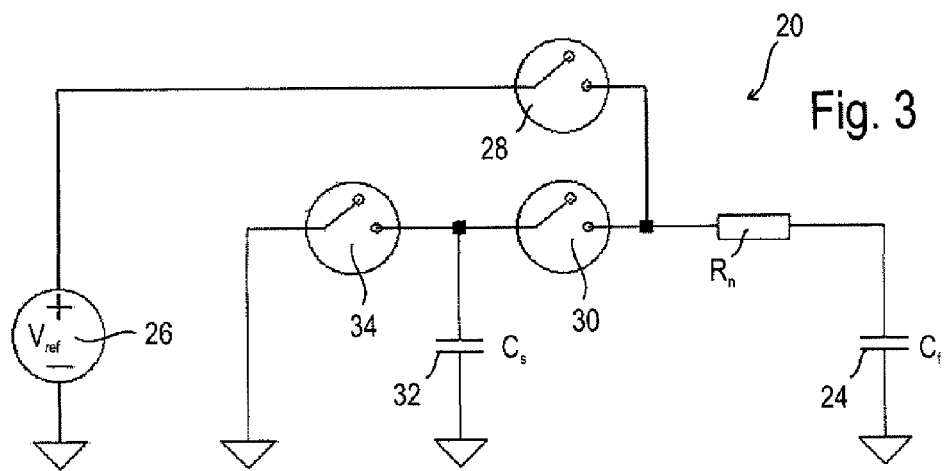
FIG. 3 shows a measuring circuit of an input device according to the invention.

FIG. 3 shows the measuring circuit 20 for a single resistor of the ohmic resistances $R_1$, $R_2$, $R_3$. The corresponding single resistor is referred to as $R_n$ in the following. The ohmic resistance $R_n$ is connected in series to the sensing capacitor 24 and forms an RC element. The sensing capacitor 24 is connected to ground via the electrostatically chargeable object 22.

A voltage source 26 is connected to the RC element via a first switch 28 and delivers a voltage $V_{ref}$. The RC element is further connected to a reference capacitor 32 via a second switch 30. The reference capacitor 32 has its second terminal connected to ground.

A third switch 34 is connected to the reference capacitor 32 and allows discharging the reference capacitor.

A method of determining the position of the electrostatically chargeable object 22 on the contact plate 12 of the input device 10 is described in the following.

In a first step, the RC element comprising the sensing capacitor 24 and the ohmic resistance $R_n$ between the contact position of the electrostatically chargeable object 22 and each one of the electrically conducting contacts 18 is measured with full electrical charge of the sensing capacitor.

To this end, the sensing capacitor 24 and the reference capacitor 32 will first be fully discharged by the first switch 28 being open and the second and third switches 30, 34 closed.

Subsequently, the sensing capacitor 24 is fully charged with the first switch 28 being closed and the second switch 30 being open. A sufficiently long charging period is selected in order to allow fully charging the sensing capacitor 24.

In a next step, a charge equalization between the sensing capacitor 24 and the reference capacitor 32 is performed with the first and third switches 28, 34 being open and the second switch 30 being closed. After charge equalization, the voltage across the reference capacitor 32 is measured.

In a subsequent process of measuring the RC element, the sensing capacitor 24 is measured at partial electrical charge. The measuring process is performed analogous to the measurement of the sensing capacitor 24 at full charge, whereas the charging duration t is selected such that the sensing capacitor 24 is charged only in part.

The ohmic resistance $R_n$ between the contact position of the electrostatically chargeable object 22 and each one of the electrically conducting contacts 18 can be determined from the measurements of the RC element at full and partial electrical charge of the sensing capacitor. This is performed according to the formula $$R_n = \frac{V_{ref} t}{C_s U_{s1} \ln\left(\frac{U_{s1}}{U_{s1} - U_{s2}}\right)}$$

Here, t corresponds to the charging duration for partially charging the sensing capacitor, $U_{S1}$ corresponds to the voltage across the reference capacitor 32 for fully charging the sensing capacitor 24, and $U_{S2}$ corresponds to the voltage across the reference capacitor 32 for partially charging the sensing capacitor 24. $C_S$ is the capacity of the reference capacitor 32, and $V_{ref}$ is the voltage of the voltage source with which the sensing capacitor is charged.

By means of the ohmic resistances $R_n$ between the contact position of the electrostatically chargeable object 22 and the electrically conducting contacts 18, the contact position of the electrostatically chargeable object on the contact plate 12 can be calculated according to the formulas $$X = \frac{\sum_{n=1}^{N} \frac{Xkontakt_n}{R_n^2}}{\sum_{n=1}^{N} \frac{1}{R_n^2}}$$

$$Y = \frac{\sum_{n=1}^{N} \frac{Ykontakt_n}{R_n^2}}{\sum_{n=1}^{N} \frac{1}{R_n^2}}$$

wherein $Xkontakt_n$ and $Ykontakt_n$ are the coordinates of the nth electrically conducting contact 18.

In the formulas for the coordinates (X, Y) of the contact position of the electrostatically chargeable object 22, the capacitance $C_S$ (being a proportionality constant) of the reference capacitor 32 is eliminated due to standardization and hence is not explicitly required for the determination of the coordinates (X, Y).

In a variation of the method, further measurements of the RC element may be carried out at partial electrical charge, different charging durations being provided. In this way, a charging duration t may be selected which allows a small measuring imprecision in determining the ohmic resistance $R_n$. The optimum charging duration varies with different capacitances $C_f$ of the sensing capacitor 24 which in turn depends on how the contact surface 14 is touched by the object 22, in particular a finger.

In the embodiment shown, the contact plate 12 comprising the electrical resistive layer 16 is essentially square shaped. However, it is also possible to provide other geometries such as rectangular or circular shapes. The arrangement of the contacts 18 may be adapted to the corresponding geometrical shape, at least two electrically conducting contacts being provided in each case.

Figure 4:
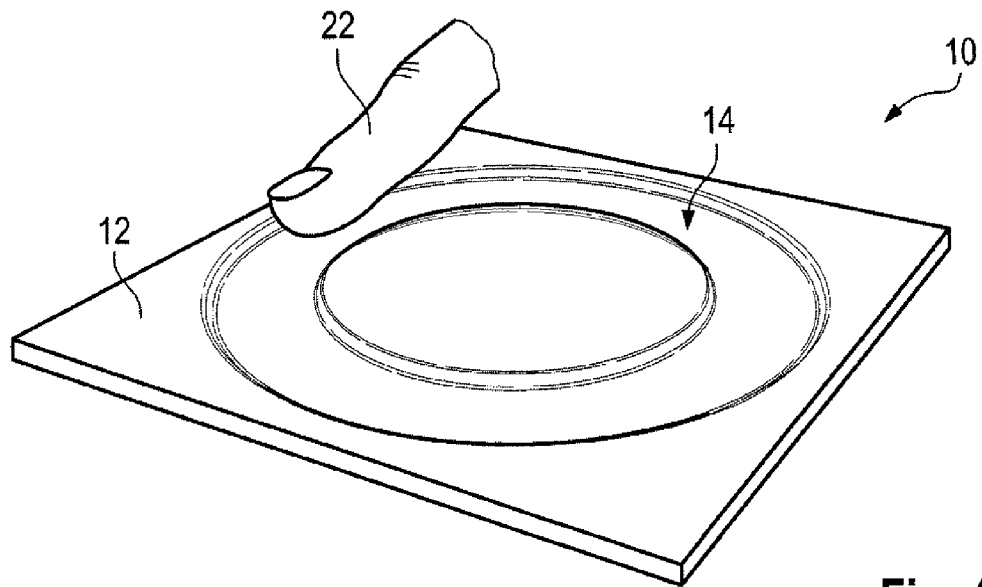
FIG. 4 shows a perspective view of an input device according to a second embodiment of the invention.
Figure 5:
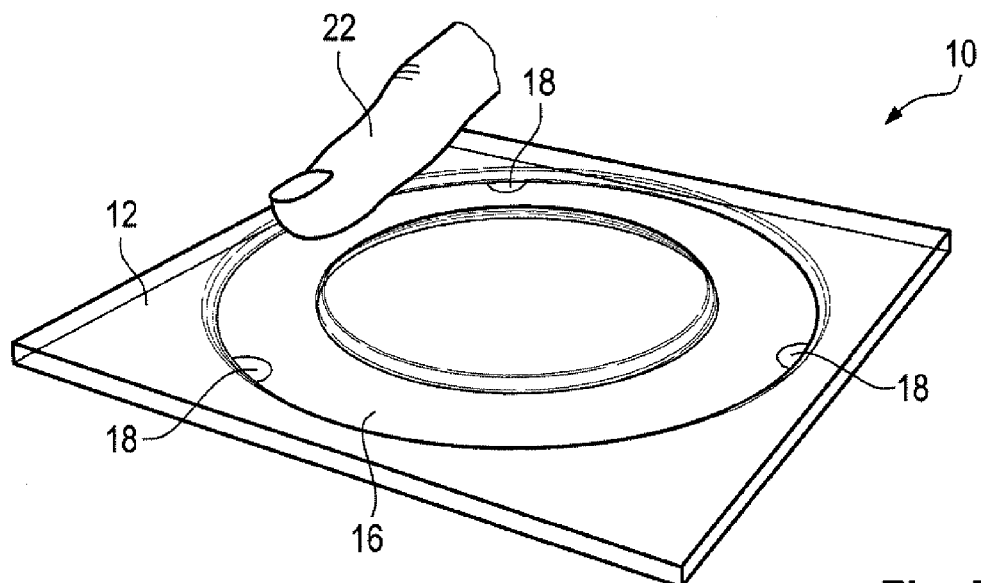
FIG. 5 shows the input device according to FIG. 4 with a transparent contact plate.

FIG. 5 shows a second embodiment of the invention. FIG. 4 shows an input device 10 comprising a contact plate 12 provided with a ring-shaped depression. In the area of the ring-shaped depression, the bottom side of the contact plate 12 is provided with an electrically conducting resistive layer 16 provided with three electrically conducting contacts 18. The contact plate 12 is illustrated so as to be transparent in FIG. 5.

It is also possible to provide a ring-shaped geometry which is not circular but shaped like a polygon.

The calculation of the coordinates is correspondingly adapted to the geometry of the electrical resistive layer 16.

Preferably, the contact plate 12 is formed so as to have a smaller thickness in the area of the electrical resistive layer 16 in order to obtain better measuring results of the sensing capacitor 24.

The invention claimed is:

1. A method of determining a contact position of an electrostatically chargeable object (22) on a contact plate (12) of an input device (10), the method comprising the process steps:

measuring, by a measuring circuit (20) of the input device (10), an RC element with a sensing capacitor ($C_f$) formed by an electrical resistive layer (16) on a contact surface (14) of the contact plate (12) and the electrostatically chargeable object (22), and an ohmic resistance ($R_n$) between the contact position of the electrostatically chargeable object (22) and each one of at least two electrically conducting contacts (18) when the sensing capacitor ($C_f$) is fully electrically charged, the measuring comprising:

fully discharging the sensing capacitor ($C_f$) and the reference capacitor ($C_S$);
fully charging the sensing capacitor ($C_f$);
equalizing charge between the sensing capacitor ($C_f$) and the reference capacitor ($C_S$); and
measuring the voltage ($U_S$) across the reference capacitor ($C_S$);

measuring, by the measuring circuit (20), the RC element for a charging duration (t) with the sensing capacitor ($C_f$) and an ohmic resistance ($R_n$) between the contact position of the electrostatically chargeable object (22) and each one of the electrically conducting contacts (18) when the sensing capacitor ($C_f$) is partially electrically charged, the measuring of the RC element for a charging duration (t) comprising:

fully discharging the sensing capacitor ($C_f$) and the reference capacitor ($C_S$);
fully charging the sensing capacitor ($C_f$);
equalizing charge between the sensing capacitor ($C_f$) and the reference capacitor ($C_S$); and
measuring the voltage ($U_s$) across the reference capacitor ($C_S$);

determining by a processing unit of the input device (10), the ohmic resistance ($R_n$) between the contact position of the electrostatically chargeable object (22) and each one of the at least two electrically conducting contacts (18) by measuring the corresponding RC element; and determining, by the processing unit, coordinates (X, Y) of the contact position of the electrostatically chargeable object (22) by means of the ohmic resistances ($R_n$) between the contact position of the electrostatically chargeable object (22) and the electrically conducting contacts (18).

2. The method according to claim 1, wherein the capacitance of the sensing capacitor ($C_f$) is determined in a process step.

3. The method according to claim 1, characterized in that the ohmic resistance ($R_n$) between the contact position of the electrostatically chargeable object (22) and each one of the electrically conducting contacts (18) is calculated according to the formula:

$$R_n = \frac{V_{ref} t}{C_s U_{s1} \ln\left(\frac{U_{s1}}{U_{s1} - U_{s2}}\right)}$$

wherein
$V_{ref}$ is the voltage at which the sensing capacitor ($C_f$) is charged,
t is the charging duration for partially charging the sensing capacitor,
$U_{S1}$ is the voltage across the reference capacitor for fully charging the sensing capacitor;
$U_{S2}$ is the voltage across the reference capacitor for partially charging the sensing capacitor;
$C_S$ is the capacity of the sensing capacitor.

4. The method according to claim 1, characterized in that the coordinates (X, Y) of the contact position of the electrostatically chargeable object (22) are calculated according to the formulas:

$$X = \frac{\sum_{n=1}^{N} \frac{X kontakt_n}{R_n^2}}{\sum_{n=1}^{N} \frac{1}{R_n^2}}$$

$$Y = \frac{\sum_{n=1}^{N} \frac{Y kontakt_n}{R_n^2}}{\sum_{n=1}^{N} \frac{1}{R_n^2}}$$

wherein
$Xkontaknt_n$ and $Ykontakt_n$ are the coordinates of the nth electrically conducting contact (18) and
$R_n$ is the ohmic resistance between the contact position of the electrostatically chargeable object (22) and the nth electrically conducting contact (18).

* * * * *